United States Patent
Dai et al.

(10) Patent No.: US 8,063,113 B2
(45) Date of Patent: Nov. 22, 2011

(54) POLYURETHANE FOAM-FORMING COMPOSITIONS CONTAINING POLYSILSESQUIOXANE CELL OPENING AGENTS

(75) Inventors: Bright Dai, Shanghai (CN); Lijun Feng, Saint Laurent (CA); Paul Austin, Williamstown, WV (US)

(73) Assignee: Momentive Performance Materials Inc., Albany, NY (US)

( * ) Notice: Subject to any disclaimer, the term of this patent is extended or adjusted under 35 U.S.C. 154(b) by 78 days.

(21) Appl. No.: 12/148,869

(22) Filed: Apr. 23, 2008

(65) Prior Publication Data

US 2009/0270523 A1    Oct. 29, 2009

(51) Int. Cl.
*C08G 18/48* (2006.01)

(52) U.S. Cl. ........ 521/110; 521/111; 521/112; 521/122; 521/125; 521/128; 521/129; 521/170; 521/174

(58) Field of Classification Search .................. 521/110, 521/111, 112, 122, 125, 128, 129, 170, 174
See application file for complete search history.

(56) References Cited

U.S. PATENT DOCUMENTS

| | | | |
|---|---|---|---|
| 3,748,288 A | 7/1973 | Winkler et al. | |
| 3,884,848 A | 5/1975 | Ricciardi et al. | |
| 4,927,864 A | 5/1990 | Frisch, Jr. et al. | |
| 4,996,257 A * | 2/1991 | Saito et al. | 524/262 |
| 6,387,972 B1 * | 5/2002 | Ghobary et al. | 521/115 |
| 6,562,268 B1 | 5/2003 | Pritchard et al. | |
| 6,773,787 B2 | 8/2004 | Maas et al. | |
| 6,774,202 B2 * | 8/2004 | Lee | 528/33 |
| 6,855,742 B2 * | 2/2005 | Hager et al. | 521/130 |
| 6,908,621 B2 | 6/2005 | Jose et al. | |
| 7,148,942 B2 | 12/2006 | Kobayashi et al. | |
| 7,220,460 B2 | 5/2007 | Murakami et al. | |
| 7,297,381 B2 | 11/2007 | Cojocariu et al. | |
| 7,312,896 B2 | 12/2007 | Shibahara | |
| 2009/0042999 A1 * | 2/2009 | Lee et al. | 521/82 |

* cited by examiner

*Primary Examiner* — John Cooney
(74) *Attorney, Agent, or Firm* — Joseph E. Waters

(57) ABSTRACT

The present invention relates to polyurethane foam-forming composition containing polysilsesquioxanes that provide high resilience flexible polyurethane molded foams having improved foam dimensional stability.

20 Claims, 2 Drawing Sheets

POLYURETHANE FOAM-FORMING COMPOSITIONS CONTAINING POLYSILSESQUIOXANE CELL OPENING AGENTS

FILED OF INVENTION

The present invention relates to high resilience flexible polyurethane molded foams having improved foam dimensional stability. More particularly the present invention relates to polyurethane foam-forming composition containing polysilsesquioxanes that provide high resilience flexible polyurethane molded foams having improved physical properties.

BACKGROUND OF THE INVENTION

In the art of making flexible polyurethane foam, it is known that by utilizing foam-forming formulations incorporating a highly reactive organic polyisocyanate and a high molecular weight polyol having a certain level of primary hydroxyl group content, a foam with improved resilience and other desirable physical properties can be accomplished. Such resulting foams have come to be referred to in the art as "high resilience" foams. Resilience is defined as the ability to return readily to original shape and dimensions after a deforming force has been applied and removed from a body. In polyurethane foam technology, the industry generally considers "Sag factor" to be the characteristic which differentiates high resilience foams from conventional foams. This Sag factor is a measure of support provided by a cushioning material and it represents the ratio of indent load deflection, ILD, at 65 percent deflection to that at 25 percent deflection (as per ASTM D-1564-64T). According to SPI standards, conventional, flexible foams exhibit a Sag factor of about 1.7 to 2.2, while high resilience foams display a factor of above about 2.2 to about 3.2.

High resilience foams have found widespread application as cushioning material in furniture and automotive seating. Most significantly, these foams have been utilized in the automotive industry for making molded auto seats. Most of the already established polyurethane foam techniques can be readily applied to high resilience foams. However, foam stabilization and collapsing, one particular area of technology, has been found to be markedly non-transferable. Due to the highly reactive nature of the reaction mixture from which the high resilience foams are prepared, such foams have been found to exhibit characteristic shrinkage upon demolding and cooling. Conventional foam reaction mixture components, which serve to stabilize the composition as it reacts, foams, and solidifies, are ineffective to prevent shrinkage in high resilience foaming reactions.

To meet the stabilization requirements of high resilience foams, there have been developed various approaches in which so-called "cell-openers" are incorporated in the foam. These added ingredients generally take the form of particles having diameters of about 2 micrometers or smaller. One technique involves the formation of "polymer-polyol" systems, which are produced from ethylenically unsaturated monomers and polyols, as exemplified by the disclosures in U.S. Pat. Nos. 3,383,351; 3,652,639 and 3,823,201. These polymer-polyols commonly are mixed with conventional polyether polyols and used as the starting polyol reactant.

Another U.S. Pat. No. 4,278,770, teaches that polyol compositions containing effectively dispersed particulate material featuring critical dispersion characteristics can be used to stabilize foam reaction in preparing high resilience polyurethane foam.

In U.S. Pat. No. 4,374,209, polymer particles are formed in a polyol by reacting an organic isocyanate with an olamine, an organic compound containing one or more hydroxyl groups and one or more amine groups. While this may provide a dispersion with utility in high resilience foam applications, the amine group is generally catalytic to the isocyanate-water reaction, resulting in a narrow processing lattitude. As such, the system is sensitive to small catalyst quantity variations. Very slight deviations from these limits can cause overly fast reaction with insufficient resilience occurring in the foam product.

When high resilience polyurethane foams are prepared it is important to ensure that the foam has a sufficient quantity of open cells to prevent shrinkage on cooling. The preparation of high resilience polyurethane foam is nearly always accompanied by the formation of some closed cells. The presence of closed cells substantially reduces the dimensional stability and flexibility of the foam while increasing its rigidity and brittleness. The closed cell content of a foam can be reduced by mechanical means such as crushing or flexing of the foam during its curing process causing the closed cells to be ruptured and opened. Alternatively, the extent of formation of closed cells can be minimized in part by careful selection of cell opening agents and their levels for the preparation of the foams.

A common problem with nearly all conventional cell openers is that they cause deterioration in the mechanical properties of the foams, especially compressive strengths. Since they do not contribute to the overall properties of the foam, except to open cells, it is desirable to reduce the quantity of cell opener required or modify it in such a way that it may contribute to the properties of the foam.

Accordingly, the present invention provides a cell-opening agent, which can assist in cell opening and maintain the mechanical properties of high resilience flexible polyurethane foam.

SUMMARY OF THE INVENTION

Figure 1:
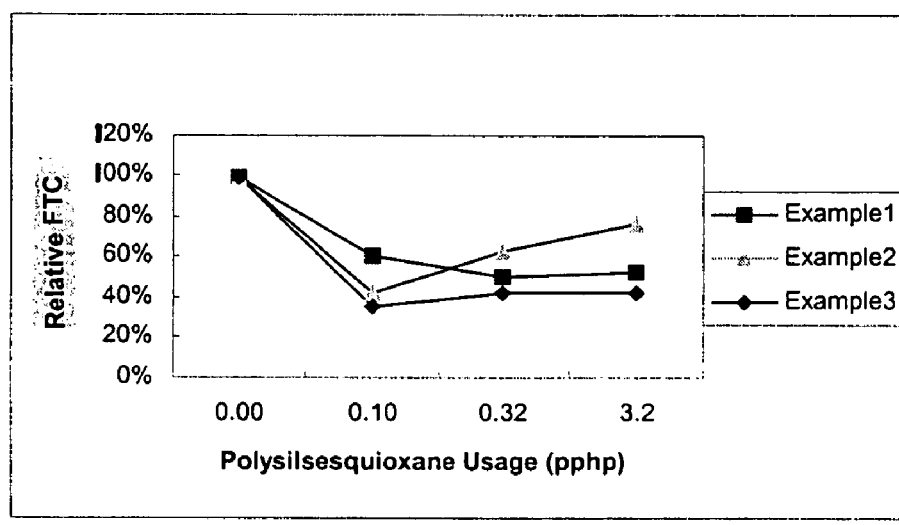
FIG. 1 is a graphic representation of the polysilsesquioxanes of Examples 1-3 in various concentrations verses Force to Crush.

The instant invention provides a foam-forming composition comprising:
  a) at least one polyol;
  b) at least one polyisocyanate;
  c) at least one polyurethane catalyst;
  d) at least one blowing agent
  e) at least one polysilsesquioxane; and, optionally,
  f) at least one component selected from the group consisting of surfactant, chain extender, crosslinker, filler, reinforcement, pigment, tint, dye, colorant, flame retardant, antioxidant, antiozonant, UV stabilizer, anti-static agent, biocide and biostat.

The present invention provides polyurethane foam-forming composition containing polysilsesquioxanes, for the preparation of high resilience, or viscoelastic polyurethane molded foams having a foam density of about 20 kg/m3 to about 60 kg/m3, with improved foam dimensional stability.

DETAILED DESCRIPTION OF THE INVENTION

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

According to one embodiment of the invention, the present invention provides a foam-forming composition comprising:
 a) at least one polyol;
 b) at least one polyisocyanate;
 c) at least one polyurethane catalyst;
 d) at least one blowing agent;
 e) at least one polysilsesquioxane; and, optionally,
 f) at least one component selected from the group consisting of surfactant, chain extender, crosslinker, filler, reinforcement, pigment, tint, dye, colorant, flame retardant, antioxidant, antiozonant, UV stabilizer, anti-static agent, biocide and biostat.

According to an embodiment of the invention, the foam-forming composition is directed to preparation of high resilience flexible polyurethane foam. High resilience (HR) foam is widely used for furniture cushions, mattresses, automotive cushions and padding, and numerous other applications requiring better support and comfort. HR foam is differentiated from conventional foam by its higher comfort or support factor and higher resilience. HR foam also is usually produced using low water levels to provide higher foam densities, typically above 20 kg/m$^3$ and often above 40 kg/m$^3$. The present invention is also useful in conventional foams, which have densities as low as 15 kg/m$^3$, and for the most part below about 40 kg/m$^3$.

According to another embodiment of the invention the foam-forming composition is directed to preparation of a viscoelastic polyurethane foam. Viscoelastic polyurethane foam (also known as "dead" foam, "slow recovery" foam, or "high damping" foam) is characterized by slow, gradual recovery from compression. While most of the physical properties of viscoelastic polyurethane foams resemble those of conventional foams, the density gradient of viscoelastic polyurethane foam is much poorer. To manufacture viscoelastic polyurethane foam, it is often desirable to use so-called "viscoelastic polyol." Viscoelastic polyol is characterized by high hydroxyl number (OH) and tends to produce shorter chain polyurethane blocks with a glass transition temperature of the resulting foam closer to room temperature.

In general, the components of polyurethane foam-forming composition of the present invention include one or more polyols, organic diisocyanates such as MDI, TDI (80/20 and/or various mixtures) and blends thereof, catalysts, silicone foam stabilizers, blowing agents and cell openers.

Polyol, i.e., component (a), useful in the polyurethane foam-forming compositions of the invention, is defined herein to be a normally liquid polymer possessing hydroxyl groups. Further, the polyol can be at least one of the type generally used to prepare polyurethane foams, e.g., a polyether polyol (a) having a molecular weight of from about 150 to about 10,000. The term "polyol" includes linear and branched polyethers (having ether linkages), polyesters and blends thereof, and comprising at least two hydroxyl groups.

Polyols containing reactive hydrogen atoms generally employed in the production of high-resilience polyurethane foams may be employed in the formulations of the present invention. The polyols are hydroxy-functional chemicals or polymers covering a wide range of compositions of varying molecular weights and hydroxy functionality. These polyhydroxyl compounds are generally mixtures of several components although pure polyhydroxyl compounds, i.e. individual compounds, may in principle be used.

Suitable polyols (a) include polyether polyol, polyester polyol, polyetherester polyols, polyesterether polyols, polybutadiene polyols, acrylic component-added polyols, acrylic component-dispersed polyols, styrene-added polyols, styrene-dispersed polyols, vinyl-added polyols, vinyl-dispersed polyols, urea-dispersed polyols, and polycarbonate polyols, polyoxypropylene polyether polyol, mixed poly (oxyethylene/oxypropylene) polyether polyol, polybutadienediols, polyoxyalkylene diols, polyoxyalkylene triols, polytetramethylene glycols, polycaprolactone diols and triols, and the like, all of which possess at least two primary hydroxyl groups. In one embodiment, some specific examples of polyether polyol (a) are polyoxyalkylene polyol, particularly linear and branched poly(oxyethylene)glycol, poly(oxypropylene)glycol, copolymers of the same and combinations thereof. Graft or modified polyether polyols, typically called polymer polyols, are those polyether polyols having at least one polymer of ethylenically unsaturated monomers dispersed therein. Non-limiting representative modified polyether polyols include polyoxypropylene polyether polyol into which is dispersed poly(styrene acrylonitrile) or polyurea, and poly(oxyethylene/oxypropylene) polyether polyols into which is dispersed poly(styrene acrylonitrile) or polyurea. Graft or modified polyether polyols comprise dispersed polymeric solids. Suitable polyesters of the present invention, include but are not limited to aromatic polyester polyols such as those made with pthallic anhydride (PA), dimethlyterapthalate (DMT) polyethyleneterapthalate (PET) and aliphatic polyesters, and the like. In one embodiment of the present invention, the polyether polyol (a) is selected from the group consisting of ARCOL® polyol 1053 and Arcol E-743, Hyperlite® E-848 from Bayer AG, Voranol® Dow BASF, Stepanpol® from Stepan, Terate® from Invista and combinations thereof.

Non-limiting examples of suitable polyols (a) are those derived from propylene oxide and ethylene oxide and an organic initiator or mixture of initiators of alkylene oxide polymerization and combinations thereof. As is well known, the hydroxyl number of a polyol is the number of milligrams of potassium hydroxide required for the complete hydrolysis of the fully acylated derivative prepared from one gram of polyol. The hydroxyl number is also defined by the following equation, which reflects its relationship with the functionality and molecular weight of polyether polyol (a):

$$\text{OH No.} = \frac{56.1 \times 1000 \times f}{M.W.}$$

wherein OH=hydroxyl number of polyether polyol (a); f=average functionality, that is, average number of hydroxyl groups per molecule of polyether polyol (a); and M.W.=number average molecular weight of polyether polyol (a). The average number of hydroxyl groups in polyether polyol (a) is achieved by control of the functionality of the initiator or mixture of initiators used in producing polyether polyol (a).

According to one embodiment of the present invention, polyol (a) can have a functionality of from about 2 to about 12, and in another embodiment of the present invention the polyol has a functionality of at least 2. It will be understood by a person skilled in the art that these ranges include all subranges there between.

In one embodiment of the present invention, polyurethane foam-forming composition comprises polyether polyol (a) having a hydoxyl number of from about 10 to about 3200. In another embodiment of the present invention, polyether polyol (a) has a hydroxyl number of from about 20 to about 2000. In yet another embodiment polyether polyol (a) has a hydoxyl number of from about 30 to about 1000. In still another embodiment polyether polyol (a) has a hydroxyl number of from about 35 to about 800.

Polyisocyanate (b) of the present invention, include any diisocyanate that is commercially or conventionally used for production of polyurethane foam. In one embodiment of the present invention, the polyisocyanate (b) can be organic compound that comprises at least two isocyanate groups and generally will be any of the known aromatic or aliphatic diisocyanates.

The polyisocyanates that are useful in the polyurethane foam-forming composition of this invention are organic polyisocyanate compounds that contain at least two isocyanate groups and generally will be any of the known aromatic or aliphatic polyisocyanates. According to one embodiment of the present invention, the polyisocyanate (b) can be a hydrocarbon diisocyanate, (e.g. alkylenediisocyanate and arylene diisocyanate), such as toluene diisocyanate, diphenylmethane isocyanate, including polymeric versions, and combinations thereof. In yet another embodiment of the invention, the polyisocyanate (b) can be isomers of the above, such as methylene diphenyl diisocyanate (MDI) and 2,4- and 2,6-toluene diisocyanate (TDI), as well as known triisocyanates and polymethylene poly(phenylene isocyanates) also known as polymeric or crude MDI and combinations thereof. Non-limiting examples of isomers of 2,4- and 2,6-toluene diisocyanate include Mondur® TDI, Papi 27 MDI and combinations thereof.

In one embodiment of the invention, the polyisocyanate (b) can be at least one mixture of 2,4-toluene diisocyanate and 2,6-toluene diisocyanate wherein 2,4-toluene diisocyanate is present in an amount of from about 80 to about 85 weight percent of the mixture and wherein 2,6-toluene diisocyanate is present in an amount of from about 20 to about 15 weight percent of the mixture. It will be understood by a person skilled in the art that these ranges include all subranges there between.

The amount of polyisocyanate (b) included in polyurethane foam-forming composition relative to the amount of other materials in polyurethane foam-forming composition is described in terms of "Isocyanate Index." "Isocyanate Index" means the actual amount of polyisocyanate (b) used divided by the theoretically required stoichiometric amount of polyisocyanate (b) required to react with all active hydrogen in polyurethane foam-forming composition multiplied by one hundred (100). In one embodiment of the present invention, the Isocyanate Index in the polyurethane foam-forming composition used in the process herein is of from about 60 to about 300, and in another embodiment, of from about 70 to about 200 and in yet another embodiment, of from about 80 to about 120. It will be understood by a person skilled in the art that these ranges include all subranges there between.

Catalyst (c) for the production of the polyurethane foam herein can be a single catalyst or mixture of catalysts such as those commonly used to catalyze the reactions of polyol and water with polyisocyanates to form polyurethane foam. It is common, but not required, to use both an organoamine and an organotin compound for this purpose. Other metal catalysts can be used in place of, or in addition to, organotin compound. Suitable non-limiting examples of polyurethane foam-forming catalysts include (i) tertiary amines such as bis(2,2'-dimethylamino)ethyl ether, trimethylamine, triethylenediamine, 1,8-Diazabicyclo[5.4.0]undec-7-ene, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, 2-{[2-(2-dimethylaminoethoxy)ethyl]methylamino}ethanol, pyridine oxide, and the like; (ii) strong bases such as alkali and alkaline earth metal hydroxides, alkoxides, phenoxides, and the like; (iii) acidic metal salts of strong acids such as ferric chloride, stannous chloride, antimony trichloride, bismuth nitrate and chloride, and the like; (iv) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2$++, $UO_2$++, and the like; (v) alcoholates and phenolates of various metals such as $Ti(OR)_4$, $Sn(OR)_4$, $Sn(OR)_2$, $Al(OR)_3$, and the like, wherein R is alkyl or aryl of from 1 to about 12 carbon atoms, and reaction products of alcoholates with carboxylic acids, beta-diketones, and 2-(N,N-dialkylamino) alkanols, such as well known chelates of titanium obtained by this or equivalent procedures; (vi) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (vii) organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaureate, dibutyltin maleate, dilauryltin diacetate, dioctyltin diacetate, dibutyltin-bis(4-methylaminobenzoate), dibuytyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like, and combinations thereof.

In one embodiment, catalyst (c) can be an organotin catalyst selected from the group consisting of stannous octoate, dibutyltin dilaurate, dibutyltin diacetate, stannous oleate and combinations thereof. In another embodiment, catalyst (c) can be an organoamine catalyst, for example, tertiary amine such as trimethylamine, triethylamine, triethylenediamine, bis(2,2-dimethylamino)ethyl ether, N-ethylmorpholine, diethylenetriamine, 1,8-Diazabicyclo[5.4.0]undec-7-ene and combinations thereof. In another embodiment, catalyst (c) can include mixtures of tertiary amine and glycol, such as Niax® catalyst C-183 (Momentive Performance Materials, Inc.), stannous octoate, such as Niax® catalyst D-19 (Momentive Performance Materials, Inc.), and combinations thereof.

According to one embodiment of the present invention, the amine catalysts (c), for the production of high resilience flexible slabstock and molded foams, include bis(N,N-dimethylaminoethyl)ether and 1,4-diazabicyclo[2.2.2]octane.

In another embodiment amine catalysts can include mixtures of tertiary amine and glycol, such as Niax® catalyst C-183, stannous octoate, such as Niax® catalyst D-19 and combinations thereof, all available from Momentive Performance Materials.

The at least one blowing agents of the foam-forming composition, i.e., component (d), either of the physical and/or chemical type, can be included in the reaction mixture. Typical physical blowing agents include methylene chloride, acetone, water or $CO_2$, which are used to provide expansion in the foaming process. A typical chemical blowing agent is water, which reacts with isocyanates in the foam, forming reaction mixture to produce carbon dioxide gas. These blowing agents possess varying levels of solubility or compatibility with the other components used in the formation of polyurethane foams. Developing and maintaining a good emulsification when using components with poor compatibility is critical to processing and achieving acceptable polyurethane foam quality.

According to an embodiment of the invention, the polysilsesquioxanes, i.e., component (e), are polyalkyl silsesquioxane materials that have the desired polyurethane cell opening properties to produce the claimed high resilience flexible polyurethane foam. Desirably, these polysilsesquioxanes are non reactive within the foam-forming composition and possess sufficient compatibility with the flexible polyurethane-foam forming composition.

The polysilsesquioxane, i.e., polyorganosilsesquioxanes or polyalkyl silsesquioxane, of the invention have a cage-like or double-ring structure. The polysilsesquioxanes can be prepared by conventional methods, such as those disclosed in F. Brown et al., J. Polymer Sci., Part C, No. 1, p. 83 (1983), in such a way that one or more of the trialkoxysilanes are hydrolyzed with an acid catalyst and condensed. Suitable examples of polyorgano silsesquioxane include polyalkyl silsesquioxanes, whereby the alkyl groups can be methyl, 2 to 18 carbon containing alkyl, phenyl, vinyl, cyclohexyl or any combination of these.

In one embodiment of the invention, the polyorgano silsesquioxane is a polyalkyl silsesquioxane, wherein the alkyl group can be a methyl, a 2 to 18 carbon containing alkyl, phenyl, vinyl, cyclohexyl or a combination thereof. Examples include polymethyl silsesquioxane, polyphenyl silsesquioxane, polyphenyl-methyl silsesquioxane, a phenyl silsesquioxane-dimethyl siloxane copolymer in liquid form, polyphenyl-vinyl silsesquioxane, polycyclohexyl silsesquioxane, and polycyclopentyl silsesquioxane.

In one embodiment of the invention, the polyorgano silsesquioxane is a polyalkyl siloxane powder material prepared by one of the followings: hydrolysis, polymerization or crosslinking of alkylsilanes or alkylsiloxanes in such a way as to give a defined particulate structure with a surface consisting largely of alkylfunctional silicone atoms.

In yet another embodiment, the silicon ladder resin is a poly(methyl silsesquioxane) obtained by hydrolytic condensation in aqueous ammonia or amines of methyltri-alkoxysilanes, or their hydroxylates or condensates. The resin is spherical in shape and form free-flowing powders, which are low in impurities such as chlorine, alkali metals, or alkaline earth metals.

According to an embodiment of the invention, the polysilsesquioxane is used in a sufficient amount to provide the desired cell opening effects in the high resilience polyurethane foams of invention. In one embodiment, the amount of polysilsesquioxane is about 0.001 to 7.5 weight percent of the total polyurethane foam-forming composition. In another embodiment, the amount of polysilsesquioxane is about 0.010 to about 5 weight percent. In another embodiment, the amount of polysilsesquioxane is about 0.20 to about 3 weight percent of the total polyurethane foam-forming composition. In yet another embodiment, the amount of polysilsesquioxane is about 0.2 to about 1 weight percent of the polyurethane foam-forming composition.

In one embodiment of the invention, the polyorgano silsesquioxane has an average particle size of about or less than 12 μm. In another embodiment, the polyorgano silsesquioxane has an average particle size of about 2 μm or less. In still another embodiment, the polyorgano silsesquioxane is a polymethyl silsesquioxane powder under the trade name Tospearl (available from Momentive performance Materials, Inc.) with a mean particle size of equal or less than about 4.0 μm. In yet another embodiment, the polyorgano silsesquioxane under the trade name Tospearl 120 (available from Momentive performance Materials, Inc.) with a mean particle size of equal or less than about 2.0 μm.

Optional surfactants include polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones, dimethyl silicone oils, and copolymers of ethylene oxide and propylene oxide and mixtures thereof in an amount ranging from 0 weight percent to about 20 weight percent, more preferably from about 0.1 weight percent to about 5 weight percent, and most preferably from about 0.2 weight percent to about 1 weight percent of the total composition. The use of silicone polyether as a non-ionic surfactant is described in U.S. Pat. No. 5,744,703 the teachings of which are herewith and hereby specifically incorporated by reference.

Other additives may be added in their usual and conventional quantities to polyurethane foam to impart specific properties to polyurethane foam, as known in the art, including, but not limited to, fire retardant, stabilizer, coloring agent, filler, anti-bacterial agent, extender oil, anti-static agent, solvent and combinations thereof.

Methods for producing polyurethane foam from the polyurethane foam-forming composition of the present invention are not particularly limited. Various methods commonly used in the art may be employed. For example, various methods described in "Polyurethane Resin Handbook," by Keiji Iwata, Nikkan Kogyo Shinbun, Ltd., 1987 may be used. For example, the composition of the present invention can be prepared by combining the polyols, amine catalyst, surfactants, blowing agent, and additional compounds including optional ingredients into a premix. This polyol blend is added to and mixed with the isocyanate.

Examples

The polysilsesquioxanes of the Examples 1-4 presented herein were manufactured by Momentive Performance Materials Inc., and provided as micro-fine silicone resins with different particles sizes ranging from 0.5 to 12 microns. Presented in Table 1 are the polysilsesquioxanes particle size and description.

TABLE 1

Polysilsesquioxane Product Data

| Polysilsesquioxane | Example 1 | Example 2 | Example 3 | Example 4 |
|---|---|---|---|---|
| Appearance | Spherical fine white powder | Spherical fine white powder | Spherical fine white powder | Spherical fine white powder |
| Average particle size (μm) | 2 | 3 | 4.5 | 4-8 |

The following formulation presented in Table 2 was prepared to evaluate the effect of polysilsesquioxane usage and size. The following formulation was based on TM20 system, i.e., TDI/MDI blend including 80% TDI and 20% MDI by weight. The prepared foam density was about 46 kg/m$^3$.

TABLE 2

High resilience flexible polyurethane molded foam formulation

| Ingredients | Parts per Hundred Polyol (pphp) |
|---|---|
| Based Polyol (1) | 80 |
| Polymer Polyol (2) | 20 |
| Diethanolamine (3) | 1 |
| Niax* A-400 (4) | 0.2 |
| Niax* A-33 (5) | 0.4 |
| Niax* L-3555 (6) | 1 |
| Water (7) | 2.94 |
| Polysilsesquioxane (8) | 0.05 |
| TM20 (9) | 42 |

(1) Based Polyol: 5000 molecular weight polyether triol prepared by the KOH catalyzed oxyalkylation of glycerol first with about 65 moles of propylene oxide and then with about 15 moles of ethylene oxide.
(2) Polymer Polyol includes 72% polyether polyol and 28% graft copolymer of styrene, acrylonitrile and polyether polyols. The OH value is 27.
(3) Diethanolamine: a chain extender in polyurethane foams, which reacts with isocyanate to get urethane group and generate heat for curing and improving foam stability.
(4) Niax* A-400: a patented catalyst from Momentive Performance Materials.
(5) Niax* A-33: a gel catalyst glycol from Momentive Performance Materials.
(6) Niax* L-3555: a silicone surfactant which offers fine cells, stabilizes foams, and improves foam surface. It is produced in Momentive Performance Materials.
(7) Water reacts with isocyanate to get urea in the foam system and generates CO$_2$ and heat.
(8) Polysilsesquioxane: a cell opening agent of the present invention made by Momentive Performance Materials, Inc.
(9) TM20 is a blend system with 80% TDI (Toluene diisocyanate) and 20% PMDI (polymeric 4,4'-methanediphenyl diisocyanate).

The formulation presented in Table 2 is a hand-mix high resilience flexible polyurethane molded foam-forming formulation prepared according to the following procedure: All foaming components, except isocyanate, are weighed into a paper cup and mixed for 30 seconds at 3000 rpm with a large mixing blade. Isocyanate is weighed into a separated container, added to the mixture previously described and mixed for an additional 6 seconds at 3000 rpm. The foaming mixture is immediately poured into 300 mm×300 mm×100 mm aluminum square mold maintained at a temperature of 65° C. The demolded time is 5 minutes. The physical properties of foams are measured according to ASTM D-3574. The Force-to-crush (FTC) is the key property related to foam cell opening. Hot ILD (Identifying Loading Deflection) means the hardness of the foams post crushing.

Figure 2:
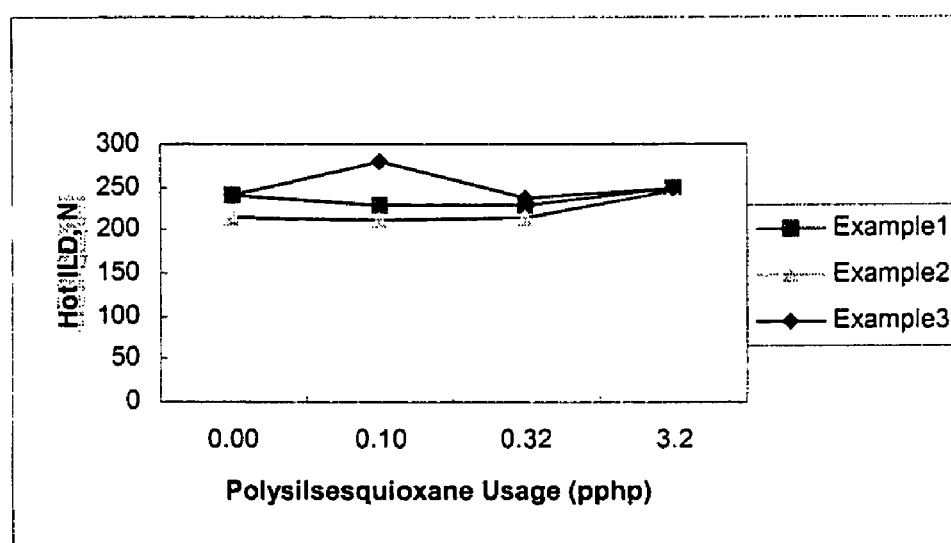
FIG. 2 is a graphic representation of polysilsesquioxane of Examples 1-3 in various concentrations verses Identifying Loading Deflection.

The foam performance is presented in FIGS. 1 and 2.

Examples 1-3 are presented in the formulations displayed FIGS. 1 and 2. 0.03 pphp of Examples 1-3 was used to prepare the high resilience flexible polyurethane molded foam-forming formulations presented in FIGS. 1 and 2. The data presented in FIG. 1 shows a significant decrease in the Force to Crush (FTC), while maintaining the Hot Indentation Loading Deflection (Hot ILD) as measured by "N" force (in unit Newton) (Hot ILD is a measure of foam hardness after demolding from mold) displayed in FIG. 2.

The foam formulation presented in Table 3 was used to evaluate polysilsesquioxanes effect in a TM20 system. The prepared foam density was about 46 kg/m$^3$.

TABLE 3

Evaluation formulation based on TM20 system

| | pphp |
|---|---|
| Based Polyol | 80 |
| Polymer Polyol | 20 |
| DEOA | 1 |
| Water | 2.94 |
| A-400 | 0.2 |
| A-33 | 0.4 |
| L-3555 | 1 |
| Cell opener | |
| TM20 (index = 100) | 42 |

0.05 pphp (part per hundred polyol) of the polysilsesquioxanes of Examples 1-4 were used as cell opening agent in the preparation high resilience flexible polyurethane molded foam as follows: Based polyol and grafted polyol were mixed together according to 80:20 weight ratio for 10 minutes in 3000 rpm. Diethanolamine, water, A-400, A-33 and L-3555 are added into the blended polyols and mixed for 10 minutes. The blended resin is ready. The blended resin and Tospearl are mixed for at least 3 minutes at 3000 rpm. TM20 isocyante is added over a 5 second interval and then mixed for another 6 seconds. Finally, they are poured into 300 mm×300 mm×100 mm square mold maintained at a temperature of 65° C. After 5 minutes, foams are demolded. After 1 minute, the foam Force-to-Crush (FTC) is measured using a Zwick Materials Testing machine according to ASTM D-3574. Following this testing, the foams are crushed, and the foam Hot ILD is measured.

The foam performances are presented in Table 4.

TABLE 4

Foam Physical properties for different cell openers formulated in TM20 system

| Name | Use Level, pphp | FTC (75%), N | Hot ILD (75%), N |
|---|---|---|---|
| Comparative Example 1 (no cell opening agent added) | 0 | 553 | 240 |
| Example 1 | 0.05 | 293 | 229 |
| Example 2 | 0.05 | 234 | 216 |
| Example 3 | 0.05 | 236 | 238 |
| Example 4 | 0.05 | 330 | 245 |
| Comparative Example 2 (41WB01*) | 1 | 398 | 228 |

*41WB01 is the commercial cell opener and produced by Bayer Materials.

0.05 pphp of Examples 1-4 reduced FTC by 40 to 50 percent. Examples 1-4 provided more effective results than commercial cell opening agent Comparative example 2, which reduced FTC by 40 percent at 20 times usage level compared to Examples 1-4. The data shows that polysisesquioxane size also affects the cell opening. Examples 2 and 3 with 3-4.5 um particle size provided the best results in this formulation. It can be also noted that the cell opening agent of all examples, do not reduce Hot ILD significantly in TM20 high resilience molded flexible polyurethane foams.

High resilience flexible polyurethane molded foams used in automobile seating were prepared using 0.05 pphp (part per hundred polyol) of Examples 1-4 as cell opener. The formulation is presented in Table 5 and was prepared as follows: Based polyol and grafted polyol are mixed together according to 75/25 weight ratio for 10 minutes at 3000 rpm by hand mixing. Diethanolamine, water, A-1, A-33 and L-3555 are added into the blended polyols. After mixing for another 10 minutes, the blended resin is ready. Examples 1-4 were added to the formulations, respectively, and mixed for at least 3 minutes at 3000 rpm. TDI is added over a 5 second period and then mixed for another 6 seconds. Finally, the foam-forming compositions were poured into 300 mm×300 mm×100 mm square mold maintained at a temperature of 65° C. After 5 minutes, foams are demolded. After 1 minute, the foam Force-to-Crush (FTC) is measured using a Zwick Materials Testing machine according to ASTM D-3574. Then, the foam was crushed, and the foam Hot ILD is measured. The results are displayed in Table 6.

TABLE 5

Evaluation formulation based on all TDI system

|  | pphp |
|---|---|
| Based Polyol | 75 |
| Polymer Polyol | 25 |
| DEOA | 0.8 |
| Water (Total) | 3 |
| A-1 | 0.1 |
| A-33 | 0.4 |
| L-3555 | 1 |
| Cell Opener | varies |
| TDI (index = 102) | 37.24 |
| Density, kg/m3 | 46 |

TABLE 6

Foam Physical properties for different cell openers formulated in all TDI system

| | Use Level, pphp | FTC (75%), N | Relative FTC | Hot ILD (75%), N |
|---|---|---|---|---|
| Comparative Example 3 (no cell opening agent added) | 0 | 1872 | 100% | 227 |
| Example 1 | 0.05 | 1421 | 76% | 207 |
| Example 2 | 0.05 | 1324 | 71% | 204 |
| Example 3 | 0.05 | 1372 | 73% | 241 |
| Example 4 | 0.05 | 1357 | 72% | 207 |
| Comparative Example 2 (41WB01) | 1 | 1586 | 85% | 249 |

0.05 pphp of Examples 1-4 in the TDI high resilience flexible polyurethane molded formulation reduced FTC by 24-30 percent. The data showed that the Examples 1-4 are more effective than the commercial cell opening agent of Comparative Example 2, which reduces FTC by 15 percent. Examples 2, 3, and 4 having a particle size of 3-8 um provided best results in this formulation. Also, as the commercial cell opening agent 41WB01, Tospearl resins do not reduce the Hot ILD significantly in all TDI high resilience flexible polyurethane molded foams.

Polysilsesquioxane in All MDI system. Again, traditional automobile seating formulation is used to prepare high resilience flexible polyurethane molded foams, see Table 7. 0.05 pphp of Example 1-4 is formulated in the foams as cell-opening agent. The foams were prepared as follows: Based polyol, Diethanolamine, water, A-400, A-33 and L-3418 are added together and mixed for 10 minutes for well mixing and to obtain a blended resin. Examples 1-4 were then added, mixed for at least 3 minutes at 3000 rpm. MDI is added over a period of 5 seconds, and the system is mixed for 6 seconds longer following total addition of the MDI. Immediately, they are poured into the 300 mm×300 mm×100 mm square mold which temperature is 65° C. After 5 minutes, foam is demolded. After 1 minute, the foam Force-to-Crush (FTC) is measured in Zwick Materials Testing machine according to ASTM D-3574. Then, the foam is crushed, and the foam Hot ILD is measured. Results are presented in Table 8.

TABLE 7

Evaluation formulation based on all MDI system

|  | pphp |
|---|---|
| Base Polyol | 100 |
| Water | 3.45 |
| DEOA | 0.5 |
| A-400 | 0.3 |
| A-33 | 0.4 |
| L-3418 | 1 |
| PAPI (index = 95) | 57.24 |
| Cell opener | varies |
| Density, kg/m$^3$ | 50 |

TABLE 8

Foam Physical properties for different cell openers formulated all MDI system

| Name | Use Level, pphp | FTC (50%), N | Hot ILD (50%), N |
|---|---|---|---|
| Comparative Example 4 (no cell opening agent added) | 0 | 1613 | 204 |
| Example 1 | 0.05 | 1467 | 192 |
| Example 2 | 0.05 | 1500 | 218 |
| Example 3 | 0.05 | 1421 | 226 |
| Example 4 | 0.05 | 1104 | 197 |
| Comparative Example 2 (41WB01) | 1 | 1365 | 161 |

0.05 pphp of Examples 1-4 was used to prepare the foams presented in Table 8 wherein the FTC was reduced by at least 8 percent. Example 4 reduced the FTC by at least 30 percent. Comparative Example 2 (i.e., commercial cell opener 41WB01) reduces this value, while polysilsesquioxane cell opener resins do not affect Hot ILD significantly. Low usage of polysilsesquioxane resin (0.05 pphp) can help open all MDI system high resilience flexible polyurethane molded foams. Example 4 is comparable with the commercial cell opener comparative Example 2 (41WB010 in reducing FTC, however Example 4 maintains the benefits of higher Hot ILD at this use level when compared to the comparative Example 2 (41WB01).

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

The invention claimed is:

1. A foam-forming composition comprising:
   a) at least one polyol;
   b) at least one polyisocyanate;
   c) at least one polyurethane catalyst;
   d) at least one blowing agent;
   e) at least one non-reactive polyorganosilsesquioxane having a spherical structure and an average particle of about 12 μm or less wherein the organo group is methyl, an alkyl containing 2 to 18 carbon atoms, phenyl, vinyl, cyclohexyl or combinations thereof; and, optionally,
   f) at least one component selected from the group consisting of, surfactant, chain extender, crosslinker, filler, reinforcement, pigment, tint, dye, colorant, flame retardant, antioxidant, antiozonant, UV stabilizer, anti-static agent, biocide and biostat.

2. The composition of claim 1 wherein the polyol (a) is at least one selected from the group consisting of polyether polyol, grafted polyether polyol polyester polyol, polycaprolactone polyol, polycarbonate polyol, polybutadiene polyol, hydroxyl-terminated polyolefin polyols, graphed polyol and polyols derived from a natural source.

3. The composition of claim 1 wherein the polyisocyanate (b) is at least one selected from the group consisting of methanediphenyl diisocyanate (MDI), polymeric MDI, modified MDI, prepolymers of MDI, toluenediisocyanate (TDI), prepolymers of TDI and modified TDI.

4. The composition of claim 1 wherein the polyisocyanate (b) is at least one selected from the group consisting of methanediphenyl diisocyanate (MDI), polymeric MDI, modified MDI, and prepolymers of MDI.

5. The composition of claim 1 wherein the polyisocyanate (b) is at least one selected from the group consisting of toluenediisocyanate (TDI), prepolymers of TDI and modified TDI.

6. The composition of claim 1 wherein the catalyst is at least one selected from the group consisting of organometallic catalysts, alkali metal carboxylates catalysts, heavy metal-based catalysts and tertiary amine urethane catalysts.

7. The composition of claim 1 wherein the polyorganosilsesquioxane is a polyalkyl silsesquioxane.

8. The composition of claim 7 wherein the polyorganosilsesquioxane is at least one selected from the group consisting of polymethyl silsesquioxanes, polyphenyl silsesquioxanes, polyphenyl-methyl silsesquioxanes, phenyl silsesquioxane-dimethyl siloxane copolymers in solid or liquid form, polyphenyl-vinyl silsesquioxanes, polycyclohexyl silsesquioxanes, and polycyclopentyl silsesquioxanes.

9. The composition of claim 1 wherein the polyorganosilsesquioxane is polymethylsilsesquioxane.

10. The composition of claim 1 wherein the polyorganosilsesquioxane has an average particle size that ranges from 0.5 μm to 12 μm.

11. The composition of claim 1 wherein the polyorganosilsesquioxane has an average particle size that ranges from 2.0 μm to 8 μm.

12. The composition of claim 1 wherein the polyorganosilsesquioxane has an average particle size that is less than 2.0 μm.

13. The composition of claim 1 wherein the polyorganosilsesquioxane is present in the polyurethane foam-forming composition in an amount from 0.001 to 10 pphp.

14. The composition of claim 1 wherein the polyorganosilsesquioxane is present in the polyurethane foam-forming composition in an amount from 0.01 to 0.05 pphp.

15. The composition of claim 1 wherein the polyorganosilsesquioxane is present in the polyurethane foam-forming composition in an amount from 0.03 to 0.05 pphp.

16. A polyurethane foam prepared from the composition of claim 1.

17. The foam of claims 16 wherein the polyurethane foam is a flexible high resilience polyurethane foam or a viscoelastic polyurethane foam.

18. The foam of claim 17 wherein the foam has a density of about 20 kg/m$^3$ to about 60 kg/m$^3$.

19. The foam of claim 17 wherein the foam has a Force-to-Crush of about 50 Newtons to about 2000 Newtons, wherein the Force-to-Crush is the peak force required to deflect a foam pad with the dimensions of 300 mm×300 mm×100 mm to 75% of its original thickness using a Zwick Materials Testing machine, one minute after demold in accordance with ASTM 0-3574.

20. The foam of claim 17 wherein the foam has a Hot Indentation Loading Deflection of about 100 Newtons to about 1500 Newtons, wherein the Hot Indentation Loading Deflection is the peak force required to deflect a crushed foam pad with the dimensions of 300 mm×300 mm×100 mm to 75% of its original thickness using a Zwick Materials Testing machine, the same foam pad used in the force-to-Crush test in accordance with ASTM 0-3574.

* * * * *